US008877292B2

(12) United States Patent
Lee

(10) Patent No.: US 8,877,292 B2
(45) Date of Patent: Nov. 4, 2014

(54) METHOD FOR MANUFACTURING BICYCLE WHEEL

(71) Applicant: Carbotec Industrial Co., Ltd., Taichung (TW)

(72) Inventor: Michael Lee, Taichung (TW)

(73) Assignee: Carbotec Industrial Co., Ltd., Taichung (TW)

(*) Notice: Subject to any disclaimer, the term of this patent is extended or adjusted under 35 U.S.C. 154(b) by 0 days.

(21) Appl. No.: 13/953,739

(22) Filed: Jul. 29, 2013

(65) Prior Publication Data

US 2013/0309407 A1 Nov. 21, 2013

Related U.S. Application Data

(63) Continuation-in-part of application No. 12/749,343, filed on Mar. 29, 2010, now abandoned.

(51) Int. Cl.

| B05D 3/02 | (2006.01) |
|---|---|
| B05D 5/00 | (2006.01) |
| B05D 5/08 | (2006.01) |
| B60T 1/06 | (2006.01) |
| B60B 5/02 | (2006.01) |
| B60B 21/08 | (2006.01) |
| F16D 65/02 | (2006.01) |

(52) U.S. Cl.
CPC *B05D 5/00* (2013.01); *B05D 5/083* (2013.01); *B60T 1/06* (2013.01); *B60B 5/02* (2013.01); *B60B 21/08* (2013.01); *F16D 65/02* (2013.01); *B60B 2310/612* (2013.01); *B60B 2310/616* (2013.01); *B60B 2360/36* (2013.01); *B60B 2900/1212* (2013.01); *B60B 2900/212* (2013.01); *B60B 2900/513* (2013.01); *F16D 2250/0046* (2013.01)
USPC ..... 427/314; 427/309; 427/372.2; 427/407.3; 427/422; 427/427.4

(58) Field of Classification Search
None
See application file for complete search history.

(56) References Cited

U.S. PATENT DOCUMENTS

| 2,944,917 A | * | 7/1960 | Cahne | 427/309 |
| 3,094,376 A | * | 6/1963 | Thomas | 264/135 |
| 3,372,053 A | * | 3/1968 | McCarthy | 427/236 |
| 5,056,630 A | * | 10/1991 | Fujii et al. | 188/24.13 |
| 2007/0102992 A1 | * | 5/2007 | Jager | 301/30 |

* cited by examiner

*Primary Examiner* — Timothy Meeks
*Assistant Examiner* — Michael P Rodriguez

(57) ABSTRACT

The bicycle wheel manufactured by the method of the present invention is made of composite material and has two opposite braking surfaces, each of which is coated with a fluoride polymer layer. Specifically, the braking surfaces are sand blasted to remove a releasing agent layer coated on the wheel. The wheel is, thereafter, placed in a spraying machine at about 100 degree Celsius and then the braking surfaces are spray-coated with a material selected from the group consisting of polytetrafluoro ethylene, fluoride ethylene-propylene copolymer, polyfluoroalkyl, ethylene-tetrafluoro ethylene copolymer and the mixture thereof until a thickness of the material is bigger than 0.4 cm. Thereafter, the wheel is gradually heated to make the material set and form the fluoride polymer layers.

4 Claims, 4 Drawing Sheets

METHOD FOR MANUFACTURING BICYCLE WHEEL

FIELD OF THE INVENTION

The present invention is a CIP of application Ser. No. 12/749,343, filed Mar. 29, 2010, the entire contents of which are hereby incorporated by reference.

BACKGROUND OF THE INVENTION

Description of the Prior Art

V-brake is a popular braking system for bicycle wheels and is advantageous in light weight and low cost. The V-brake can clamp the braking surfaces of the wheels to decelerate the bicycle. However, the V-brake can overheat the braking surfaces, leading to the deformation of the wheels and/or the flat tire.

Therefore, the present invention has arisen to resolve or at least mitigate the above mentioned disadvantages.

SUMMARY OF THE INVENTION

The main object of the present invention is to provide a method for manufacturing bicycle wheel with heat-resist braking surfaces.

To achieve the above and other objects, the method for manufacturing bicycle wheel made of composite material and having two opposite braking surfaces of the present invention including: the braking surfaces being sand blasted to remove a releasing agent layer coated on the wheel; the wheel being placed in a spraying machine at about 100 degree Celsius and then the braking surfaces being spray-coated with a material selected from the group consisting of polytetrafluoro ethylene, fluoride ethylene-propylene copolymer, polyfluoroalkyl, ethylene-tetrafluoro ethylene copolymer and the mixture thereof until a thickness of the material is bigger than 0.4 cm; the wheel being gradually heated to make the material set and form fluoride polymer layers.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
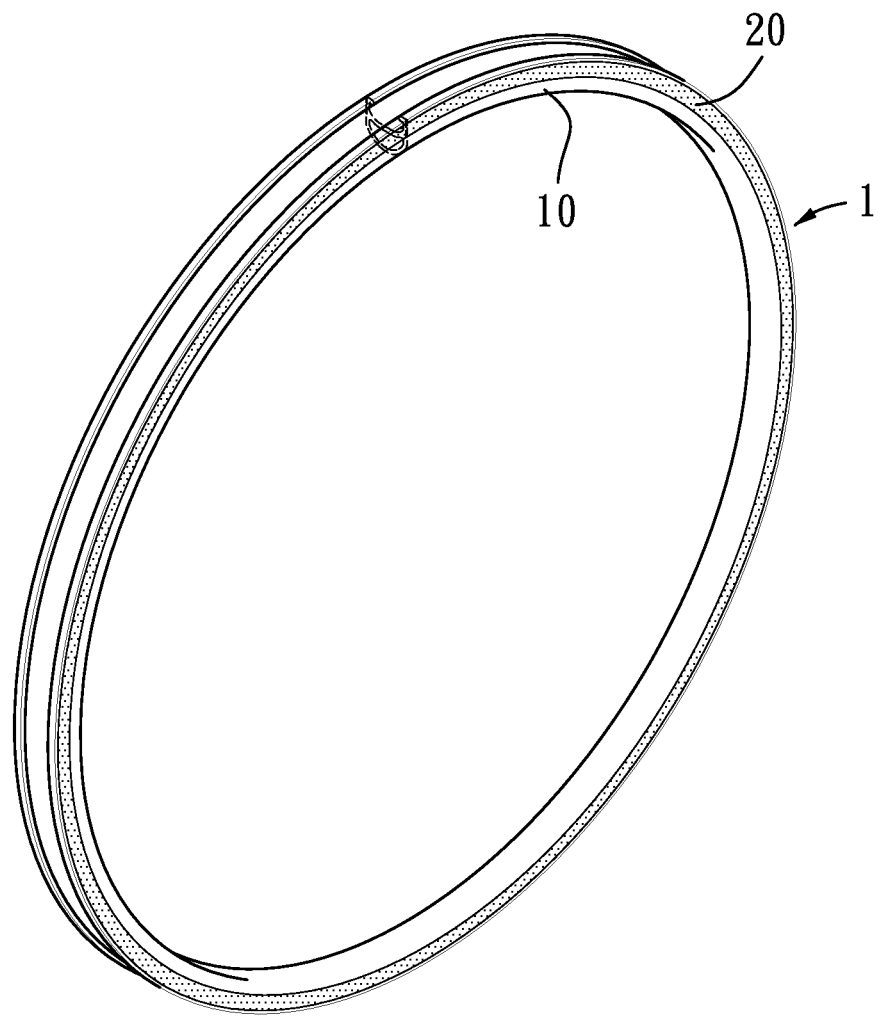
FIG. 1 is a perspective drawing showing a bicycle wheel manufactured by a method of the present invention.

Please refer to FIG. 1. The bicycle wheel 1 of the present invention is made of composite material such as carbon fiber, glass fiber or Kevlar fiber and has two opposite braking surfaces 10, which can be clamped by a V-brake to decelerate. Each braking surfaces 10 is coated with a fluoride polymer layer 20.

Figure 2A:
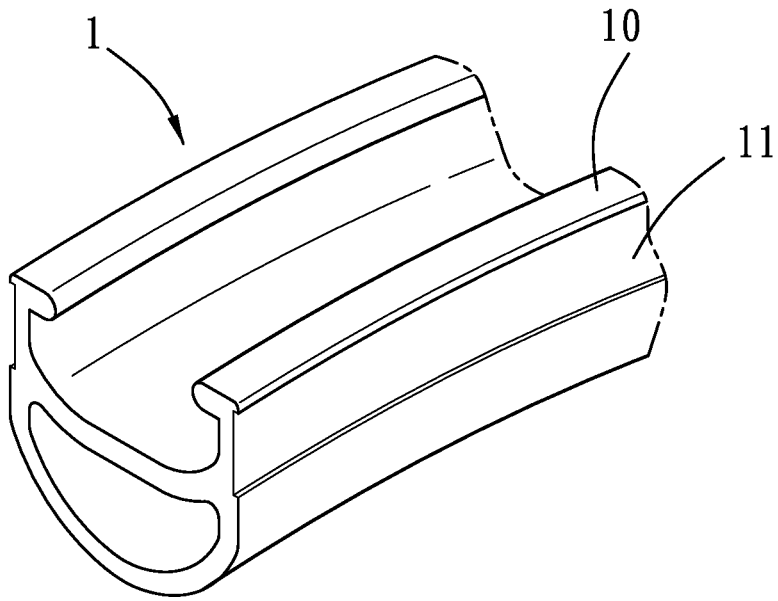
FIG. 2A is a partial perspective drawing showing a bicycle wheel frame manufactured by a method of the present invention.
Figure 2B:
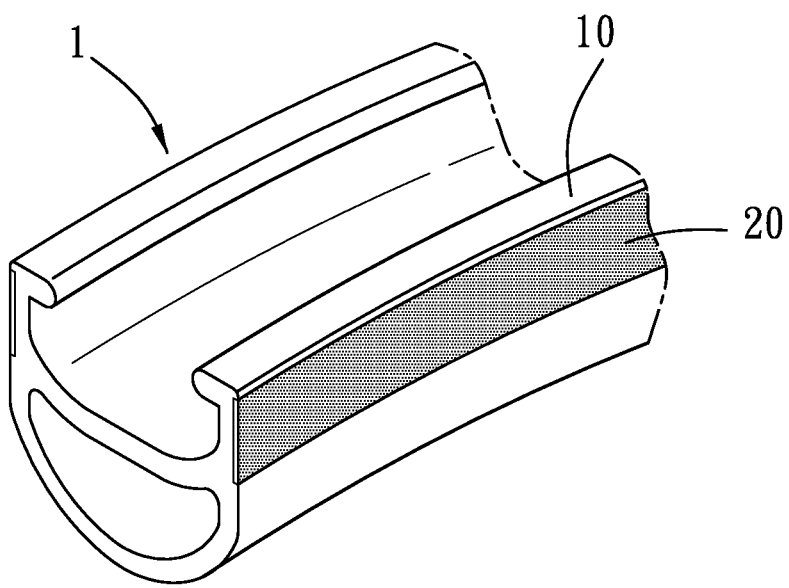
FIG. 2B is a partial perspective drawing showing a bicycle wheel frame coated with fluoride polymer layer of the present invention.
Figure 3:
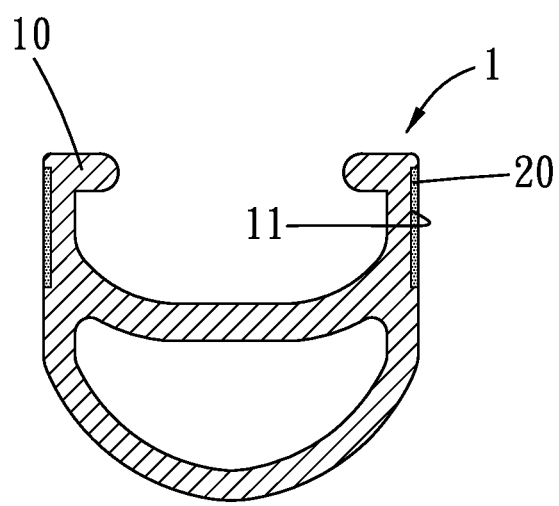
FIG. 3 is a profile of FIG. 2B.

Please refer to FIG. 2A, FIG. 2B and FIG. 3. In the present embodiment, the braking surfaces 10 are formed with a groove 11 respectively, and the fluoride polymer layers 20 are coated in the grooves 11. Because the wheel is made of composite material, a releasing agent layer is coated on outer surfaces thereof. As such, the braking surfaces 10 are sand blasted to remove the releasing agent and then are preferably polished to become smooth. Thereafter, the wheel 1 is placed in a spraying machine at about 100 degree Celsius and then braking surfaces 10 are spray-coated with a material selected from the group consisting of polytetrafluoro ethylene, fluoride ethylene-propylene copolymer, polyfluoroalkyl, ethylene-tetrafluoro ethylene copolymer and the mixture thereof until a thickness of the material is bigger than 0.4 cm, preferably between 0.5-0.6 cm. To reach said thickness, the braking surfaces is preferably spray-coated for several times, e.g. twice or three times, and time intervals are given between each two spray-coating procedures. Specifically, the material and the wheel are both pre-heated to 100 degree Celsius, so that the material can be easily coated on the braking surfaces 10. Thereafter, the wheel is gradually heated to make the material set and form the fluoride polymer layers 20. More specifically, the wheel coated with the material is placed in a heating device, e.g. the spraying machine or an oven, and stays at 100 degree Celsius for 30 minutes, then the wheel is heated to 110 degree Celsius for 10 minutes, then the wheel is heated to 120 degree Celsius for 35 minutes, then the wheel is heated to 140 degree Celsius for 40 minutes, then the wheel is heated to 160 degree Celsius for 30 minutes, then the wheel is finally heated to 180 degree Celsius for 60 minutes to form the fluoride polymer layers 20.

It is to be noted that if the wheel is heated to 180 degree Celsius rapidly, the fluoride polymer layers 20 will bubble, which leads to insufficient structural strength and aesthetic defects, as well as the fact that the layers 20 may tend to delaminate from the braking surfaces 10.

Figure 4:
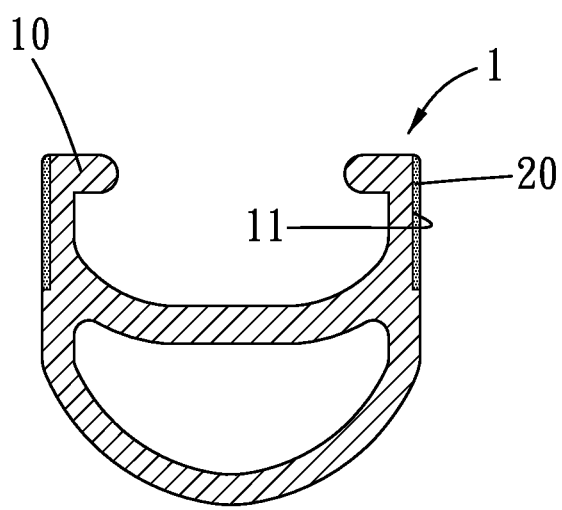
FIG. 4 is a profile showing another bicycle wheel manufactured by a method of the present invention.

As shown in FIG. 4, the braking surfaces 10 may also be stepped for the fluoride polymer layers 20 to coat thereon. Also, the braking surfaces can be flat without grooves or stepped structures.

After the fluoride polymer layers 20 are formed, the wheel 1 has an outer surface consisting of a fluoride polymer containing area and a fluoride polymer non-containing area. The fluoride polymer non-containing area further undergoes a surface treatment procedure, such as patching-up, polishing and varnishing. Note that if the surface treatment is made before the coating of the fluoride polymer layers, the patching material and the vanish may be deteriorated and melt, causing other aesthetic disadvantages.

The fluoride polymer layers 20 can increase the heat-resistance of the braking surfaces. Further, the fluoride polymer layers mixed with titanium metal powder can further elevate the heat-resisting performance and the mechanical strength of the layers.

A result of braking test is shown in the following Table 1, in which each wheel is driven to rotate and then clamped to stop 3000 times. Thereafter the surface temperature on the braking surface is measured in the unit of degree Celsius:

TABLE 1

|  | Fans on | Fans off |
|---|---|---|
| Wheel coated with fluoride polymer layers | 70-80 | 100-120 |
| Wheel without fluoride polymer layers | 90-120 | 140-160 |

As shown in Table 1, the surface temperature of the wheel manufactured by the method of the present invention is lower than that of the wheel without fluoride polymer layers, no matter the fans are turned on or not. Accordingly, the wheel manufactured by the method of the present invention can mitigate the problem resulted from over-heated braking surfaces, thus the safety performance of the bicycle using the wheel manufactured by the method of the present invention can be elevated.

What is claimed is:

1. A method for manufacturing a bicycle wheel, the wheel being made of composite material comprising carbon fiber, glass fiber, or Kevlar fiber, and having two opposite braking surfaces, the method comprising:
   sand blasting the braking surfaces to remove a releasing agent layer coated on the wheel;
   polishing the braking surfaces to become smooth;
   heating the wheel to about 100° Celsius in a spraying machine;
   spray-coating the braking surfaces at least twice with a heated spray material selected from the group consisting of polytetrafluoro ethylene, fluoride ethylene-propylene copolymer, ethylene-tetrafluoro ethylene copolymer, and mixtures thereof until a thickness of the material is bigger than 0.4 cm, wherein the spray material is heated to 100° Celsius before spray-coating onto the braking surfaces; and
   gradually heating the wheel to at most 180° Celsius to set the spray material and form fluoride polymer layers.

2. The method for manufacturing a bicycle wheel of claim 1, wherein the step of gradually heating the wheel to form the fluoride polymer layers comprises:
   heating the wheel to 100° Celsius for 30 minutes;
   heating the wheel to 110° Celsius for 10 minutes;
   heating the wheel to 120° Celsius for 35 minutes;
   heating the wheel to 140° Celsius for 40 minutes;
   heating the wheel to 160° Celsius for 30 minutes; and
   heating the wheel to 180° Celsius for 60 minutes.

3. The method for manufacturing a bicycle wheel of claim 1, wherein after the fluoride polymer layers are formed, the wheel has an outer surface consisting of a fluoride polymer containing area and a fluoride polymer non-containing area, the method further comprising performing a surface treatment procedure on the fluoride polymer non-containing area.

4. The method for manufacturing a bicycle wheel of claim 1, wherein the spray material further comprises titanium metal mixed therein.

* * * * *